(12) United States Patent
Tsutsui

(10) Patent No.: US 7,268,988 B2
(45) Date of Patent: Sep. 11, 2007

(54) APPARATUS AND METHOD FOR DETECTING ROTATION

(75) Inventor: Toshio Tsutsui, Takahama (JP)

(73) Assignee: DENSO CORPORATION, Kariya (JP)

( * ) Notice: Subject to any disclaimer, the term of this patent is extended or adjusted under 35 U.S.C. 154(b) by 336 days.

(21) Appl. No.: 11/000,907

(22) Filed: Dec. 2, 2004

(65) Prior Publication Data

US 2005/0135035 A1    Jun. 23, 2005

(30) Foreign Application Priority Data

Dec. 22, 2003  (JP)  ............................. 2003-424685

(51) Int. Cl.
H02H 7/08    (2006.01)
(52) U.S. Cl. .................... 361/31; 180/443; 180/444
(58) Field of Classification Search ............ 361/31, 361/23; 180/443, 444
See application file for complete search history.

(56) References Cited

U.S. PATENT DOCUMENTS

| | | | |
|---|---|---|---|
| 4,718,514 A * | 1/1988 | Hirakushi ................ | 180/422 |
| 4,782,907 A * | 11/1988 | Morishita et al. ........ | 180/412 |
| 4,869,334 A * | 9/1989 | Marumoto et al. ....... | 180/446 |
| 4,893,688 A * | 1/1990 | Morishita ................ | 180/445 |
| 4,953,649 A * | 9/1990 | Kawai et al. ............ | 180/412 |
| 5,493,214 A | 2/1996 | Good et al. .............. | 324/173 |
| 6,523,638 B1 * | 2/2003 | Yamauchi et al. ......... | 180/446 |
| 6,577,957 B2 * | 6/2003 | Fujimoto et al. .......... | 702/36 |
| 7,012,399 B2 * | 3/2006 | Suzuki .................... | 318/661 |
| 2003/0111974 A1 | 6/2003 | Suzuki .................... | 318/661 |
| 2004/0128042 A1 * | 7/2004 | Takahashi et al. ......... | 701/41 |
| 2005/0159866 A1 * | 7/2005 | Takeuchi et al. .......... | 701/41 |

FOREIGN PATENT DOCUMENTS

| | | |
|---|---|---|
| EP | 1318061 | 11/2003 |
| JP | A-2001-264114 | 9/2001 |
| JP | A-2003-175834 | 6/2003 |

OTHER PUBLICATIONS

Examination Report from European Patent Office issued on Apr. 18, 2006 for the corresponding European patent application No. 04 028 594.2-1236, (a copy thereof).

* cited by examiner

Primary Examiner—Rita Leykin
(74) Attorney, Agent, or Firm—Posz Law Group, PLC

(57) ABSTRACT

In a rotation detection apparatus, a rotation-angle detector detects a rotation angle of a rotating body based on an output signal generated by a resolver. An exciting-signal generation circuit supplies an exciting signal for exiting the resolver to generate the output signal. An abnormality detection circuit detects an abnormality of an exciting-signal output terminal for outputting the exciting signal or an abnormality of an exciting-signal line for transmitting the exciting signal. A power-supply stopping circuit stops a power supply to the exciting-signal generation circuit when the abnormality detection circuit detects an abnormality of the exciting-signal output terminal or detects an abnormality of the exciting-signal line.

9 Claims, 9 Drawing Sheets

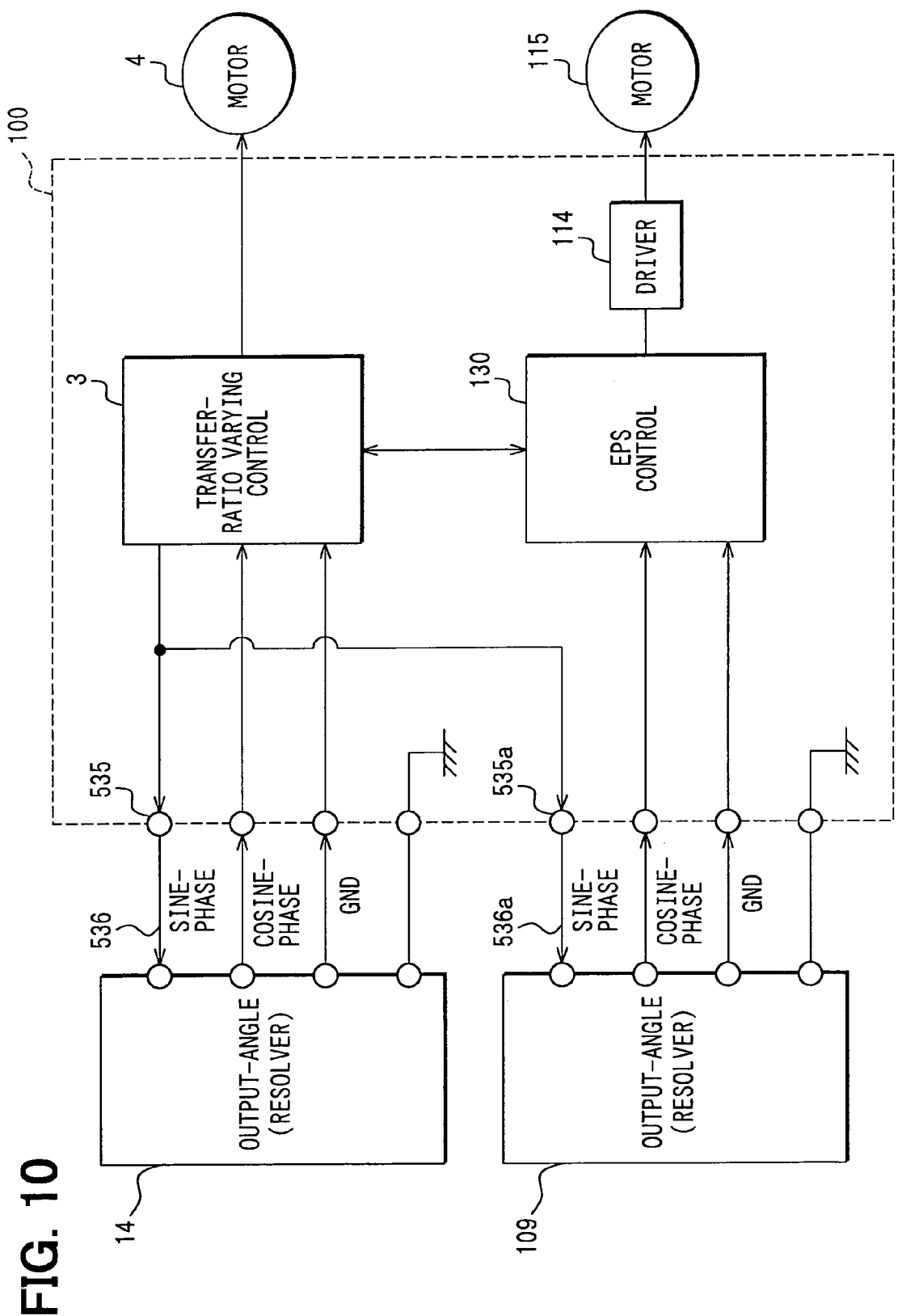

APPARATUS AND METHOD FOR DETECTING ROTATION

CROSS REFERENCE TO RELATED APPLICATION

This application is based on and incorporates herein by reference Japanese Patent Application No. 2003-424685 filed on Dec. 22, 2003.

FIELD OF THE INVENTION

The present invention relates to an apparatus and method for detecting a rotation angle of a rotating body by using a resolver.

BACKGROUND OF THE INVENTION

In order to generate a rotating magnetic field depending on an electrical angle in a rotating body such as a brushless motor, for example, the rotational position (rotation angle) of a rotor is detected by using typically a resolver, and a control unit drives a three-phase bridge circuit based on a detection signal generated by the resolver. In accordance with this method, the output of the resolver needs to be converted into a position signal by using typically a special R/D converter (conversion unit for converting a resolver signal into a digital signal).

However, the use of the R/D converter, which is larger and more expensive than other components, increases the size and manufacturing cost of an ECU (electronic control unit). In order to solve this problem, the ECU is provided with a microcomputer for outputting an exciting signal to the resolver and finding a rotation angle based on a signal, which is output by the resolver in accordance with the exciting signal.

In addition, the ECU is also provided with an input/output circuit for facilitating the computation of the rotation angle by the microcomputer. Then, the rotation angle is computed (patent document 1) or the rotation angle is corrected (patent document 2) by using input and output signals of the input/output circuit.

[Patent Document 1] Japanese Patent Laid-open No. 2003-166803, which corresponds to US 20030111974A1

[Patent Document 2] Japanese Patent Laid-open No. 2001-264114

In accordance with the apparatus in patent document 1, in the event of a failure caused by a short circuit between a terminal outputting an exciting signal to a resolver (such a terminal is referred to hereafter as an exciting-signal output terminal) or a signal line and a power supply (such a failure is referred to hereafter as a power-supply short-circuit failure) or in the event of a failure caused by a short circuit between the exciting-signal output terminal or the signal line and the ground (such a failure is referred to hereafter as a ground short-circuit failure), it is likely that a current excessively greater than a current flowing at a normal time continues to flow to a circuit connected to the exciting-signal output terminal.

In order to solve the above problem, when an abnormality of the exciting-signal output terminal is detected, only power supplied to an actuator driven and controlled by the ECU is cut off while an IG switch for supplying power to the ECU is kept in an ON state in order to prevent the system from being stopped due to discontinuation of an operation of power supply to the ECU. In consequence, however, the exciting signal is generated as it is. As a result, it is found that, since the excessively large current continues to flow to the circuit connected to the exciting-signal output terminal from a power supply by way of the ECU, internal components in the circuit overheats and fails.

SUMMARY OF THE INVENTION

It is thus an object of the present invention addressing the problems described above to provide an apparatus and method, which detects a power-supply short-circuit failure or a ground short-circuit failure without abnormally dissipating heat in a resolver and peripheral circuits.

According to the present invention, when an abnormality of an exciting-signal output terminal is detected, only power supplied to an actuator driven and controlled by an ECU is cut-off while an ignition switch for supplying power to the ECU is kept in an ON state as it is in order to prevent the system from being stopped due to discontinuation of an operation of power supply to the ECU. However, the operation of power supply to the exciting-signal generation means is stopped.

As a result, the generation of the exciting signal is also discontinued, so that a current no longer flows to circuits connected to the exciting-signal output terminal and the occurrence of a failure can thus be avoided. In addition, since no current flows to these circuits due to a short-circuit failure, heat can be reliably prevented from being dissipated in devices in the circuits. Thus, devices each having low resistance to heat can be employed, making it possible to reduce the sizes of the devices. As a result, the product cost and the manufacturing cost can be reduced.

Preferably, a failure caused by a short circuit between a power-supply line and the exciting-signal output terminal or the exciting-signal line or a failure caused by a short circuit between a ground line and the exciting-signal output terminal or the exciting-signal line is detected as an abnormality. In general, a short circuit or a wire breaking is an abnormality generated on a signal line at a high probability. In the case of a wire breaking, no current flows. Thus, at least, a short circuit needs to be detected. A short-circuit failure causing a current exceeding a rating current to easily flow can be detected.

In addition, since no current flows to these circuits due to a short-circuit failure, heat can be reliably prevented from being dissipated in devices in the circuits. Thus, devices each having low resistance to heat can be employed, making it possible to reduce the sizes of the devices. As a result, the product cost and the manufacturing cost can be reduced.

More preferably, it is determined whether a sum of squares for a sine-phase signal generated by the resolver in dependence on the exciting signal and a sum of squares for a cosine-phase signal generated by the resolver in dependence on the exciting signal become smaller than a predetermined value, as the two short-circuit failures. When the exciting signal supplied to the resolver becomes abnormal, the sine-phase and cosine-phase signals generated by the resolver each also exhibit an abnormal waveform. That is, by monitoring the two signals from the resolver all the time as is the case with this configuration, the two short-circuit failures cited above can be detected. The two short-circuit failures are detected based on the sum of squares for each of sine-phase and cosine-phase signals.

Preferably, a reference signal is used for generating the exciting signal and the reference signal generation is stopped upon detection of abnormality. Thus, even in the event of a short-circuit failure, no current flows to the exciting-signal generation circuit so that no further failures occur. In addition, since no current flows to these circuits due to a short-circuit failure, heat can be reliably prevented from being dissipated in devices in the circuits. Thus, devices each having low resistance to heat can be employed, making it possible to reduce the sizes of the devices. As a result, the product cost and the manufacturing cost can be reduced.

BRIEF DESCRIPTION OF THE DRAWINGS

The above and other objects, features and advantages of the present invention will become more apparent from the following detailed description made with reference to the accompanying drawings. In the drawings:

FIG. 10 is a diagram showing the entire configuration of a steering control system.

DETAILED DESCRIPTION OF THE PREFERRED EMBODIMENT

Figure 1:
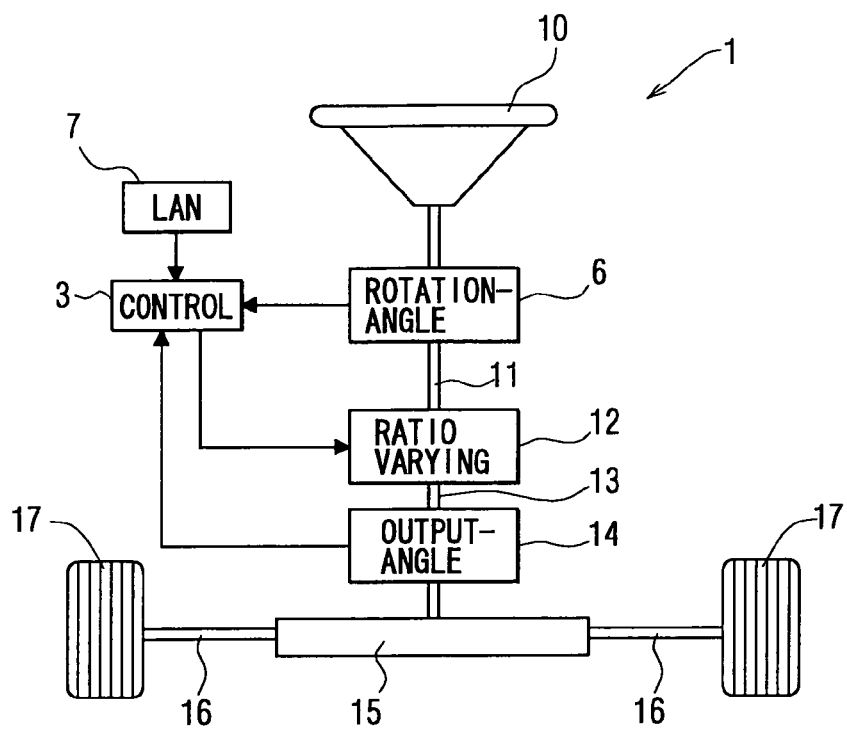
FIG. 1 is a diagram showing the entire configuration of a transfer-ratio-varying control apparatus as an embodiment of the present invention.
Figure 2:
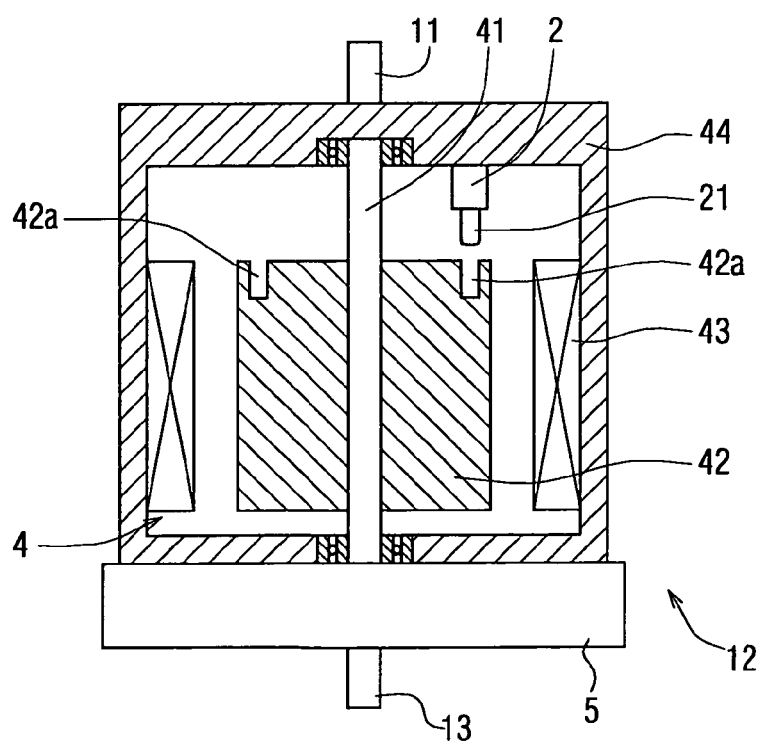
FIG. 2 is a diagram showing details of the transfer-ratio-varying control apparatus.
Figure 3:
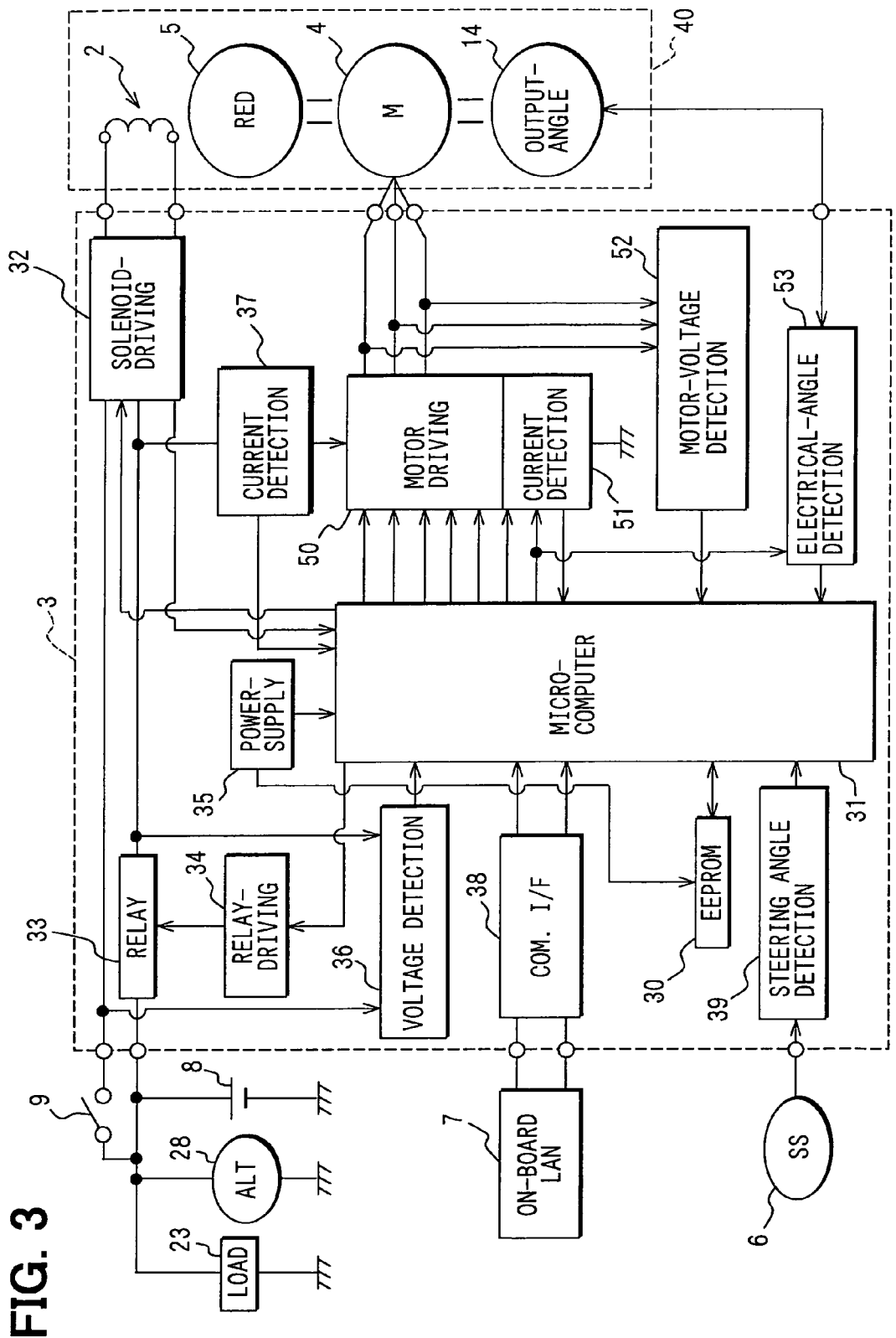
FIG. 3 is a diagram showing details of a microcomputer.

FIG. 1 is a diagram showing an apparatus according to the present invention, which is applied to a transfer-ratio-varying steering apparatus for a vehicle. FIG. 2 is a diagram showing an axial-direction cross section of a transfer-ratio-varying unit 12 in the transfer-ratio-varying steering apparatus 1. FIG. 3 is a block diagram showing the circuit configuration of the whole transfer-ratio-varying steering apparatus 1. It is to be noted that the rotation detection apparatus provided by the present invention can be applied to apparatus other than the transfer-ratio-varying steering apparatus 1.

First, a steering wheel 10 is connected to the upper end of an input shaft 11 as shown in FIG. 1. The lower end of the input shaft 11 is connected to the upper end of an output shaft 13 through a transfer-ratio-varying unit 12. On the lower end of the output shaft 13, a pinion not shown in the figure is provided. In a steering gear box 15, this pinion is engaged with a rack bar 16. In addition, in the steering gear box 15, an electric power steering apparatus not shown in the figure is provided. Each of the two ends of the rack bar 16 is connected to a vehicle wheel 17 through a tie rod and an arm, which are not shown in the figure.

A steering-angle sensor 6 (input rotation-angle detection means) is provided on the input shaft 11 as a sensor for detecting a steering angle of the steering wheel 10. On the other hand, implemented by a resolver, an output-angle sensor 14 (rotation-angle detection means and output rotation-angle detection means) is provided on the output shaft 13 as a sensor for detecting a steering angle of the vehicle wheels 17. It is to be noted that the output-angle sensor 14 may also be provided in the transfer-ratio-varying unit 12.

A detection signal output by the steering-angle sensor 6 as a steering angle of the input shaft 11 and a detection signal output by the output-angle sensor 14 as a rotation angle of the output shaft 13 are supplied to an electronic transfer-ratio control unit 3. In addition, the transfer-ratio control unit 3 also receives other information such as a vehicle-speed signal and an engine revolution speed signal from an on-board LAN (Local Area Network) 7. The transfer-ratio control unit 3 outputs a control signal for controlling the transfer-ratio-varying unit 12.

As shown in FIG. 2, the transfer-ratio-varying unit 12 has a configuration comprising a well-known electric brushless motor 4 and a reduction mechanism 5. The transfer-ratio-varying unit 12 rotates the electric motor 4 to vary the rotation angle of the output shaft 13 in accordance with signals received from the steering-angle sensor 6 and the on-board LAN 7. The electric motor 4 has a configuration comprising a stator 43 and a rotor 42, which are enclosed in a motor housing 44.

On the steering-wheel side of the motor housing 44, a link pin 21, an engagement hole 42a and a solenoid coil 2 for moving the link pin 21 are provided to form a link mechanism. The link pin 21 is forced by a resilient member such as a spring not shown in the figure to move in an engagement direction parallel to the axial direction of a rotation shaft 41 toward the engagement hole 42a. Thus, when no current flows through the solenoid coil 2, the link pin 21 is held in a state of being engaged with the engagement hole 42a.

When a current flows from a solenoid-driving circuit 32 to the solenoid coil 2 in accordance with a command issued by the transfer-ratio control unit 3, an electromagnetic force is generated in a direction of releasing the link pin 21 from the engagement hole 42a (that is, in an upward direction in the figure) in parallel to the axial direction of the rotation shaft 41, being applied to the link pin 21. When this electromagnetic force exceeds the biasing force of the resilient member, the link pin 21 is released from the state of being engaged with the engagement hole 42a.

In the steering mechanism described above, first, when a speed signal coming from the on-board LAN 7 and a steering angle detected by the steering-angle sensor 6 are supplied to the transfer-ratio control unit 3, the transfer-ratio control unit 3 computes a target rotation angle for the output shaft 13 based on these information. Then, the transfer-ratio control unit 3 outputs a motor control command based on the target rotation angle to the transfer-ratio-varying unit 12 as a PWM signal (pulse width modulation signal). The motor control command drives the electric motor 4 in the transfer-ratio-varying unit 12 to provide the vehicle wheels 17 with a steering angle corresponding to a rotation angle equal to the sum of the target rotation angle and the rotation angle of the steering wheel 10.

Then, the transfer-ratio control unit 3 infers an actual steering angle of the vehicle wheels 17 based on the detection signal received from the output-angle sensor 14 in execution of feedback control for reliably providing the vehicle wheels 17 with a steering angle corresponding to the target rotation angle. In the mean time, a current is kept supplied from a solenoid-driving circuit 32 to the solenoid coil 2 in accordance with a command issued by the transfer-ratio control unit 3. Then, an electromagnetic force is generated in a direction of releasing the link pin 21 from the engagement hole 42a (that is, in the upward direction in FIG. 2) in parallel to the axial direction of the rotation shaft 41. That is, the rotor 42 is disengaged from the motor housing 44.

It is to be noted that, when the transfer-ratio control unit 3 detects an abnormality (such as a ground short circuit of the solenoid coil 2) of the transfer-ratio-varying unit 12, the transfer-ratio control unit 3 outputs a command to the solenoid-driving circuit 32 to stop a current flowing to the solenoid coil 2.

In this way, the solenoid coil 2 no longer generates an electromagnetic force, so that a biasing force of the resilient member not shown in the figure moves the link pin 21 in a direction approaching the rotor 42 (that is, in an downward direction in FIG. 2) in parallel to the axial direction of the rotation shaft 41. Then, the link pin 21 is engaged with the engagement hole 42a provided on the rotor 42. As a result, the rotor 42 is linked to the motor housing 44.

Next, the configuration of the transfer-ratio-varying steering apparatus 1 is described by referring to FIG. 3.

The transfer-ratio-varying steering apparatus 1 comprises the solenoid coil 2, the transfer-ratio control unit 3, the electric motor 4 and the reduction mechanism 5. It is to be noted that the transfer-ratio control unit 3 corresponds to an abnormality detection means, a reference-signal generation means, a power-supply stop means, a relative-angle computation means, and a cut-off means.

The solenoid coil 2 is connected to the solenoid-driving circuit 32 in the transfer-ratio control unit 3. The solenoid-driving circuit 32 will be described later. In accordance with a driving signal received from the solenoid-driving circuit 32, the solenoid coil 2 generates the electromagnetic force to disengage the link pin 21 from the engagement hole 42a.

Based on information received from the steering-angle sensor 6 and the on-board LAN 7, the transfer-ratio control unit 3 controls a current flowing through the solenoid coil 2 and an operation to drive the electric motor 4. The transfer-ratio control unit 3 comprises a microcomputer 31, the solenoid-driving circuit 32, a relay 33, a relay-driving circuit 34, a power-supply circuit 35, a voltage detection circuit 36, a current detection circuit 37, a communication I/F (interface) 38, a steering-angle detection circuit 39 (rotation-angle detection means), a motor-driving circuit 50, a current detection circuit 51, a motor-voltage detection circuit 52 and an electrical-angle detection circuit 53.

Figure 4:
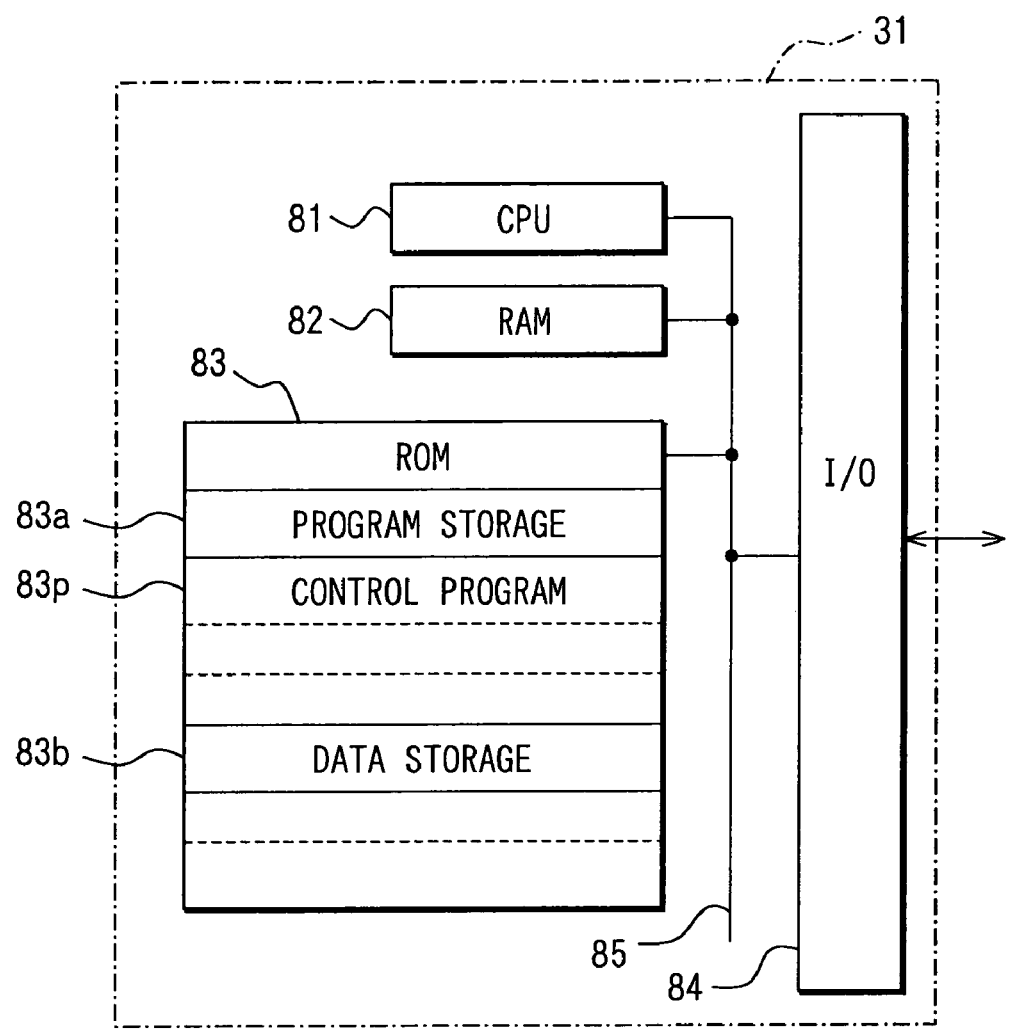
FIG. 4 is a diagram showing details of a transfer-ratio control unit.

Based on information received from the steering-angle sensor 6 and the on-board LAN 7, the microcomputer 31 finds magnitudes of currents to be supplied to the solenoid coil 2 and the electric motor 4. Based on the magnitudes of the currents, the microcomputer 31 outputs control signals. As shown in FIG. 4, the microcomputer 31 comprises a CPU 81, a ROM 83, a RAM 82 and an I/O 84 serving as an input/output interface. Connected to each other by typically a bus line 85, the CPU 81, the ROM 83, the RAM 82 and the I/O 84 are each a well-known component. Various kinds of processing based on the information supplied to the microcomputer 31 and processing to output control signals to a variety of peripheral circuits from the microcomputer 31 are carried out by execution of a control program 83p stored in the ROM 83.

Based on a control signal from the microcomputer 31, the solenoid-driving circuit 32 controls a current flowing through the solenoid coil 2 to engage and disengage the link pin 21 with and from the engagement hole 42a. The solenoid-driving circuit 32 is connected to a battery 8 through the relay 33.

The relay 33 is thus provided between a battery 8 and the solenoid-driving circuit 32. The relay 33 is turned on to connect the solenoid-driving circuit 32 to the battery 8 and turned off to disconnect the solenoid-driving circuit 32 from the battery 8. Controlled by a control signal from the microcomputer 31, the relay-driving circuit 34 turns on and off the relay 33.

Connected to the battery 8 through the IG switch 9, the power-supply circuit 35 supplies a current to the microcomputer 31. The voltage detection circuit 36 detects a value of the voltage of the battery 8 and supplies the detected voltage value to the microcomputer 31. The current detection circuit 37 supplies a current from the battery 8 to the motor-driving circuit 50 and detects a value of the supplied current, supplying the detected current value to the microcomputer 31.

The communication I/F 38 converts information received from the on-board LAN 7 into data that can be processed by the microcomputer 31. The information includes the vehicle-speed signal and the engine revolution speed signal. The communication I/F 38 then supplies the data resulting from the conversion to the microcomputer 31 as the converted vehicle-speed signal and the engine revolution speed signal. In order to suppress an instable movement of the vehicle, a signal for forcibly changing the target rotation angle is supplied from the on-board LAN 7 to the microcomputer 31. It is to be noted that the signal for forcibly changing the target rotation angle is supplied from the on-board LAN 7 to the communication I/F 38, for example, when the vehicle wheels 17 slip.

The steering-angle detection circuit 39 converts a steering-angle signal received from the steering-angle sensor 6 into data that can be processed by the microcomputer 31 and supplies the data resulting from the conversion to the microcomputer 31 as the converted steering-angle signal.

The motor-driving circuit 50 has six switching transistors composing a well-known three-phase bridge circuit. Based on driving signals generated by the microcomputer 31, the six switching transistors are subjected to PWM duty control to drive the electric motor 4.

The current detection circuit 51 detects values of currents flowing through the six switching transistors in the motor-driving circuit 50 and supplies the detected current values to the microcomputer 31. On the other hand, the motor-voltage detection circuit 52 detects values of voltages applied to the six switching transistors in the motor-driving circuit 50 and supplies the detected voltage values to the microcomputer 31.

The electrical-angle detection circuit 53 converts a rotation-angle (electrical angle) signal detected by the output-angle sensor 14, which is connected to the reduction mechanism 5 through the output shaft 13, into data that can be processed by the microcomputer 31 and supplies the data resulting from the conversion to the microcomputer 31 as the converted rotation-angle signal.

As an operation of the transfer-ratio-varying steering apparatus 1, the microcomputer 31 outputs a control signal to the solenoid-driving circuit 32 and, in accordance with the control signal, the solenoid-driving circuit 32 supplies a current to the solenoid coil 2 to release the link pin 21 from the engagement hole 42a. Thus, the link between the motor housing 44 and the rotor 42 is cut off. Then, by rotating the electric motor 4 based on signals received from the steering-angle sensor 6 and the on-board LAN 7, the rotational force generated by the electric motor 4 is transferred to the output shaft 13 by way of the reduction mechanism 5.

Subsequently, a torque sensor in the electric power steering apparatus detects a torque, which is a sum of a steering force applied by the driver and a torque generated by the output shaft 13 experiencing the rotational force propagated from the electric motor 4. As a result, the steering angle of the vehicle wheels 17 is changed by the electric motor 4 in the electric power steering apparatus not shown in the figure.

Next, a method adopted by the transfer-ratio control unit 3 to control the revolution speed of the electric motor 4 is described. The electrical-angle detection circuit 53 converts a control signal originated in the transfer-ratio control unit 3 into an exciting signal and applies the exciting signal to the excitement phase of the output-angle sensor 14, driving the output-angle sensor 14 to generate sine-phase and cosine-phase signals in accordance with the rotation angle (electrical angle).

The electrical-angle detection circuit 53 converts the sine-phase and cosine-phase signals into data that can be processed by the microcomputer 31 and supplies the data resulting from the conversion to the microcomputer 31 as the converted output sine-phase and cosine-phase angle signals. The microcomputer 31 computes a rotation angle θ by using generally known formula (1) given below. In the expression of the following formula, sinωt denotes the exciting signal.

$$\theta = \tan^{-1}(\text{sine-phase output signal} \div \text{cosine output signal}) = \tan^{-1}(\sin \omega t \times \sin \theta \div \sin \theta t \times \cos \theta) \quad (1)$$

Figure 5:
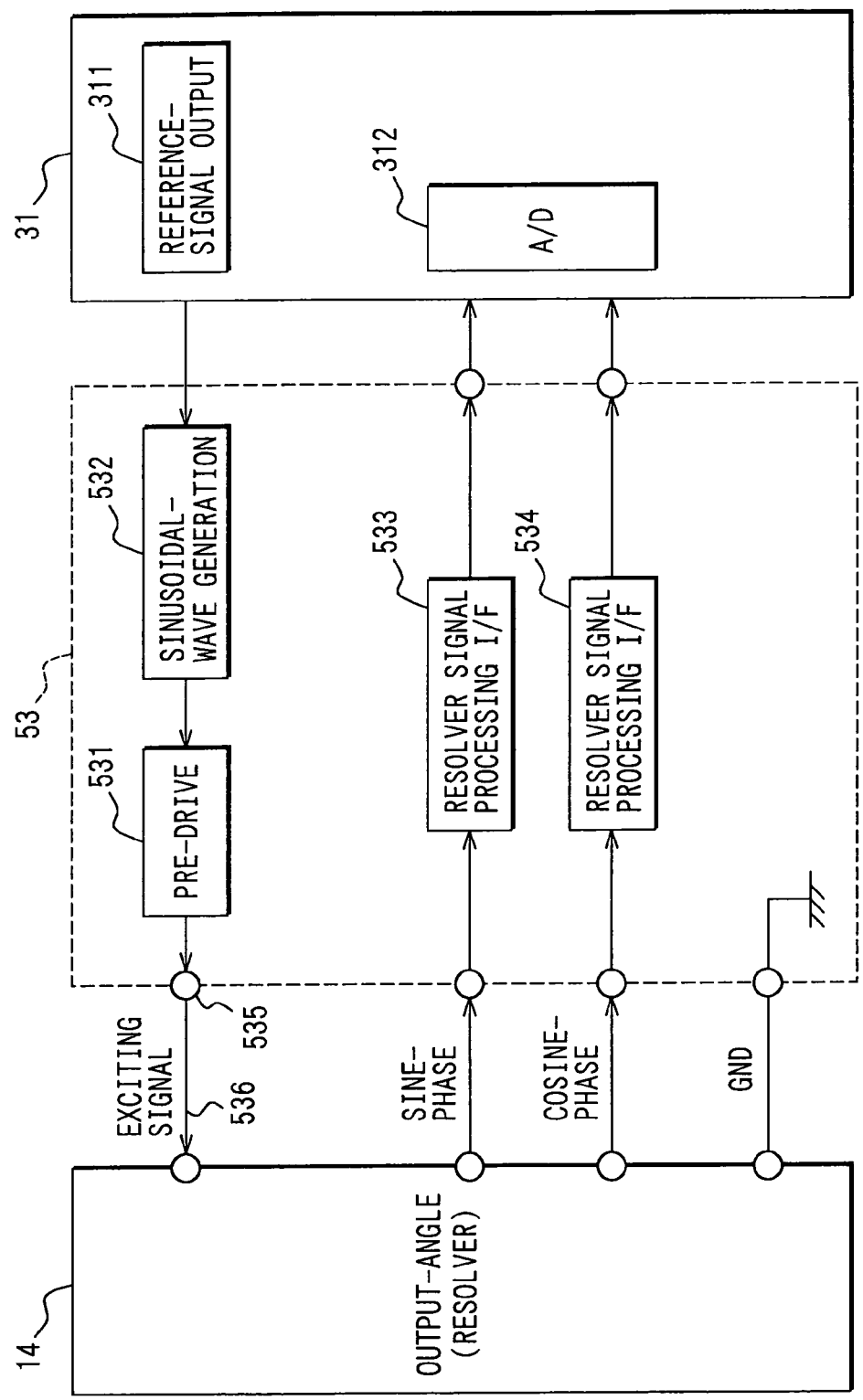
FIG. 5 is an explanatory diagram referred to in describing the operation of an electrical-angle detection circuit.

FIG. 5 is a control block diagram showing the configuration of the electrical-angle detection circuit 53 (exciting-signal generation means). A reference-signal output means 311 (reference-signal generation means) in a control unit of the microcomputer 31 outputs a reference signal having a periodical waveform to a sinusoidal-wave generation circuit 532 in the electrical-angle detection circuit 53. The sinusoidal-wave generation circuit 532 shapes the waveform of the input reference signal and a pre-drive circuit 531 amplifies the reference signal with a shaped waveform to a predetermined amplitude. The pre-drive circuit 531 outputs the amplified reference signal to the output-angle sensor 14 as an exciting signal by way of a exciting-signal output terminal 535 and an exciting-signal line 536.

Receiving the exciting signal, the output-angle sensor 14 outputs a sine-phase signal and a cosine-phase signal, which are based on the exciting signal, to the electrical-angle detection circuit 53. In the electrical-angle detection circuit 53, resolver signal processing I/F circuits 533 and 534 convert the sine-phase and cosine-phase signals respectively into signals that can be processed by the microcomputer 31. The signals obtained as results of the conversion of sine-phase and cosine-phase signals are supplied to A/D (analog/digital) conversion terminals of the microcomputer 31.

In the microcomputer 31, an A/D converter 312 converts the sine-phase and cosine-phase signals into digital data, which is used as a basis for computing a rotation angle of the electric motor 4. Then, the computed rotation angle is compared with the target rotation angle and a control signal is output to the motor-driving circuit 54 to drive the electric motor 4 so that the difference between the computed rotation angle and the target rotation angle becomes a zero.

(First Power-Supply Termination Method)

Figure 6:
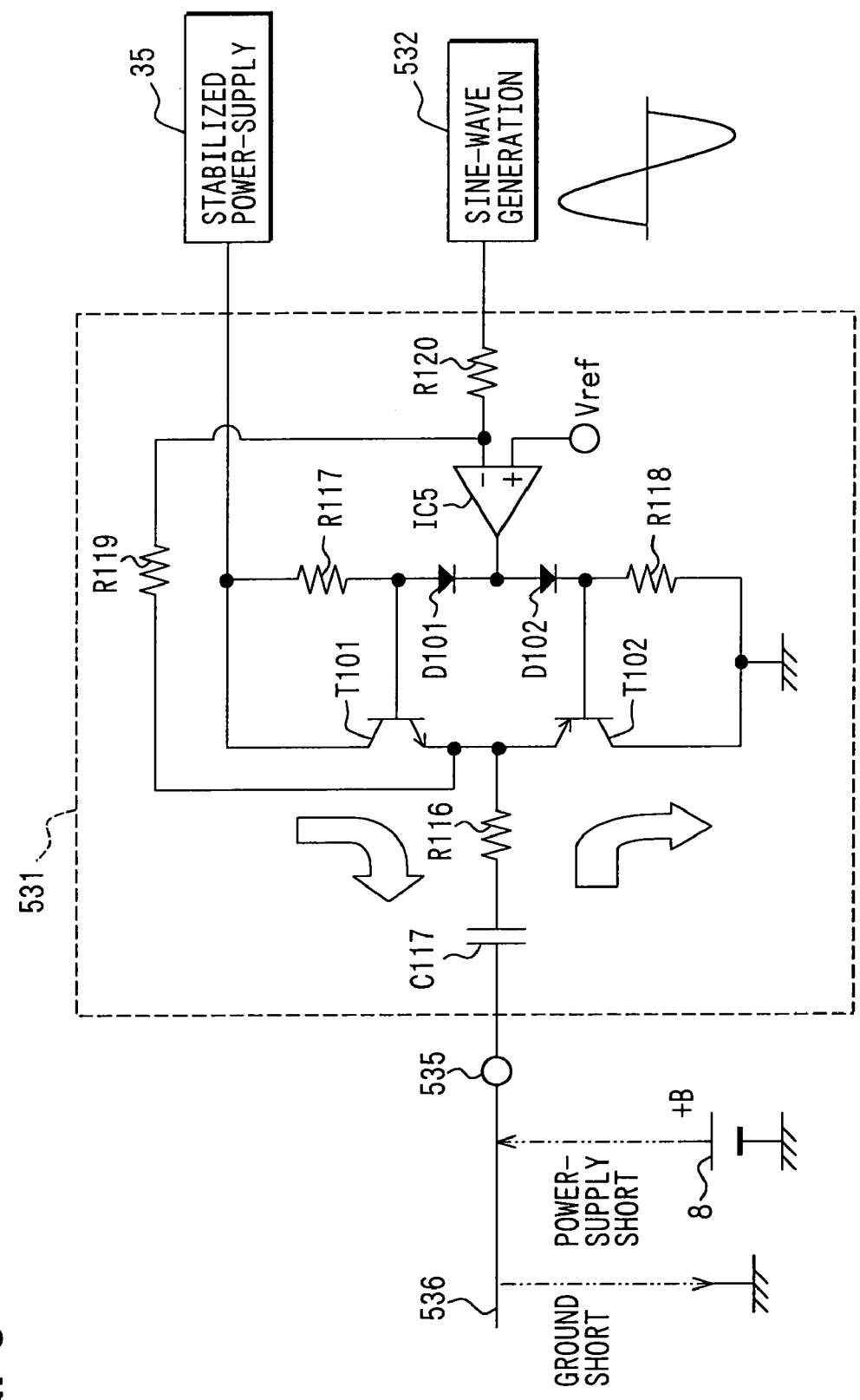
FIG. 6 is an explanatory diagram referred to in describing a first typical method to stop an operation of power supply in the embodiment.

FIG. 6 is a diagram showing a state of generating a failure caused by a power-supply short circuit between the exciting-signal output terminal 535 or the exciting-signal line 536, by way of which the exciting signal is supplied to the output-angle sensor 14, and the +B terminal (the battery voltage terminal and a voltage line signal connected to the battery voltage terminal) or caused by a ground short circuit between the exciting-signal output terminal 535 or the exciting-signal line 536 and GND (the ground).

When a power-supply or ground short circuit occurs on the exciting-signal output terminal 535 or the exciting-signal line 536, naturally, a current excessively greater than an exciting current applied to the excitation phase of the resolver would flow through a resistor R116, a capacitor C117 as well as transistors T101 and T102. In dependence on the flowing time duration of the excessively large current, these components would thus abnormally dissipate heat in some cases.

At that time, since the waveform of the input exciting signal is found different from a waveform appearing at a normal time in the output-angle sensor 14, the waveforms of the output sine-phase and cosine-phase signals based on the exciting signal are also different from those at the normal time. By recognizing the changes in waveform in the transfer-ratio control unit 3, a power-supply or ground short circuit of the exciting-signal output terminal 535 or the exciting-signal line 536 can be detected. Specifically, a sum of squares for the sine-phase and a sum of squares for the cosine-phase are found in terms of θ found in the formula expressed by Eq. (1) as follows:

$$\text{sine-phase square sum} = A \times \sin \theta \times \sin \omega t + A \times \sin \theta \times \sin(\omega t + 120°) + A \times \sin \theta \times \sin(\omega t 240°)$$

$$\text{cosine-phase square sum} = A \times \cos \theta \times \sin \omega t + A \times \cos \theta \times \sin(\omega t + 120°) + A \times \cos \omega \times \sin(\omega t + 240°)$$

As is obvious from the above equations, the sine-phase square sum and the cosine-phase square sum are each computed by fetching values at three points each in a 120° sub-period of one period (of 360°) of the exciting signal. However, the sine-phase square sum and the cosine-phase square sum can also be each computed by fetching values at four points each in a 90° sub-period of one period of the exciting signal or more than 4 points.

Figure 8:
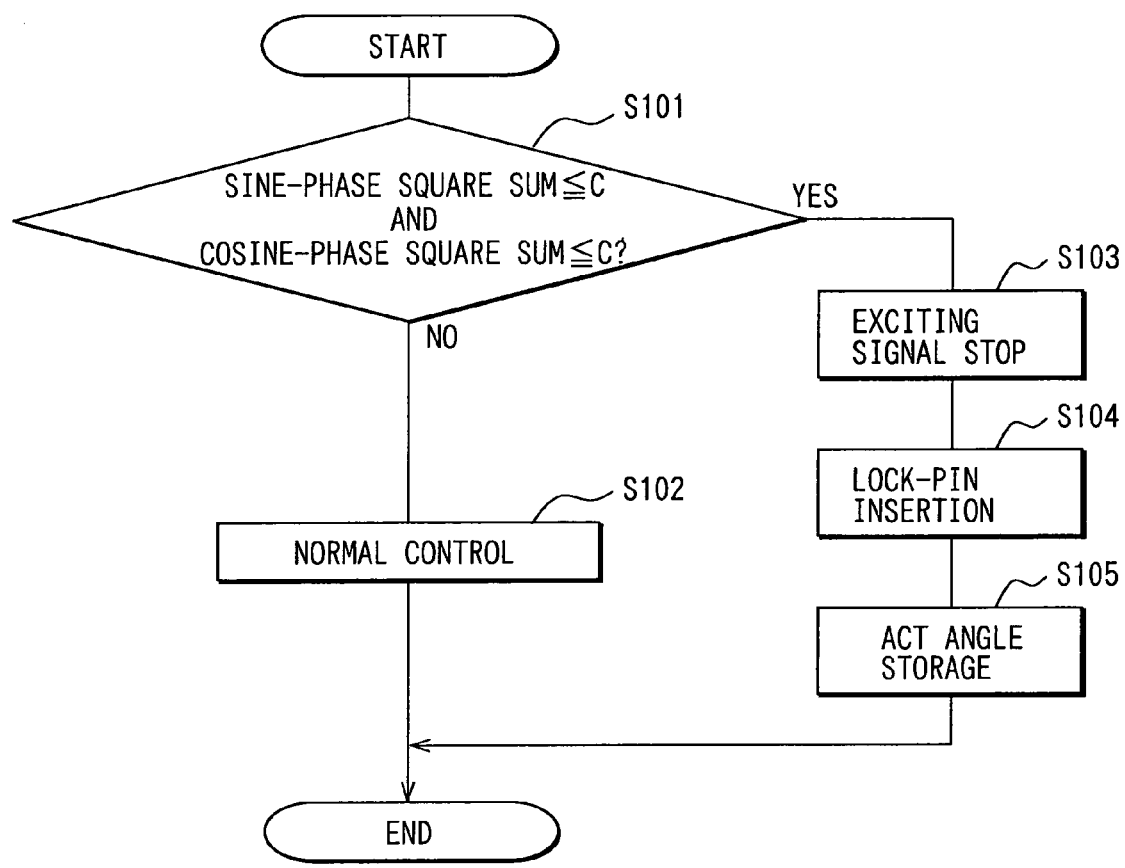
FIG. 8 shows a flowchart representing a method to stop an operation of power supply.

By referring to a flowchart shown in FIG. 8, the following description explains processing by the transfer-ratio-varying steering apparatus 1 to detect a power-supply or ground short circuit of the exciting-signal output terminal 535 or the exciting-signal line 536. It is to be noted that this processing is carried out by execution of a control program stored in either of a ROM and a RAM, which are included in the microcomputer 31 but shown in none of the figures. First of all, a sine-phase square sum and a cosine-phase square sum are computed and compared with a threshold value C determined in advance. When a determination result indicates that either the sine-phase square sum or the cosine-phase square sum exceeds the threshold value C (that is, the determination result of Step S101 is NO), the normal control processing of the transfer-ratio-varying steering apparatus is carried out (at Step S102).

When both the sine-phase square sum and the cosine-phase square sum do not exceed the threshold value C (that is, the determination result of Step S101 is YES), on the other hand, the occurrence of a fault caused by a power-supply or ground short circuit of the exciting-signal output terminal 535 or the exciting-signal line 536 is confirmed. In this case, the generation of the reference signal from the reference-signal output means 311 is stopped (at Step S103). As a result, the output operation of the sinusoidal-wave generation circuit 532 in the electrical-angle detection circuit 53 is also stopped.

Accordingly, an input electric potential appearing at a −terminal of an IC 5 is equal to an input electric potential (Vref) appearing at a +terminal thereof, so that no amplification is carried out. This is because amplification of an input of 0V will result in an output of 0V too. Therefore, the output to the resistor R116 also disappears. In addition, an operation to output an exciting signal from the exciting-signal output terminal 535 is stopped too.

Then, the microcomputer 31 outputs a control signal to the solenoid-driving circuit 32, controlling the solenoid-driving circuit 32 to stop driving the solenoid coil 2. Since the solenoid coil 2 is no longer driven, the biasing force of the resilient member such as the spring shown in none of the figures puts the link pin 21 in a state of being engaged with the engagement hole 42a (at Step S104). As a result, the input shaft 11 and the output shaft 13 are put in a state of being linked to each other so that, even if a failure occurs in the transfer-ratio-varying steering apparatus 1, the vehicle can be steered.

In addition, at that time, a difference in rotation angle between the input shaft 11 and the output shaft 13 is stored in the EEPROM 32 (rotation-angle storage means). The EEPROM (electrically erasable & programmable read only memory) means a ROM, data stored in which can be electrically erased (or overwritten) but remains even if the power supply is turned off. It is to be noted that the difference in rotation angle between the input shaft 11 and the output shaft 13 is found between the steering angle of the steering wheel 10 and the steering angle of the vehicle wheels 17. The steering angle of the steering wheel 10 is detected by the steering-angle sensor 6 whereas the steering angle of the vehicle wheels 17 is computed from a rotation angle detected by the output-angle sensor 14.

(Second Power-Supply Termination Method)

Figure 7:
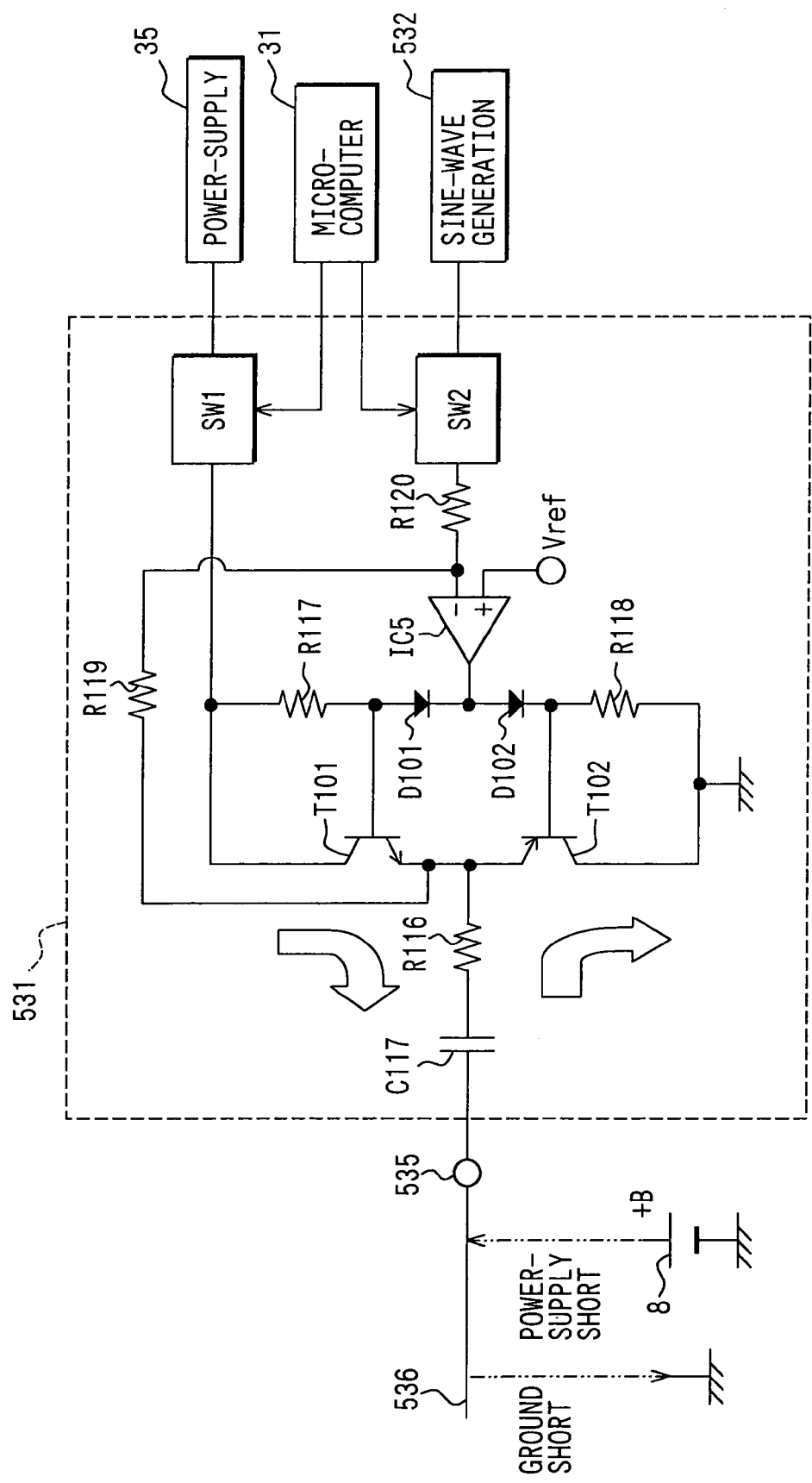
FIG. 7 is an explanatory diagram referred to in describing a second typical method to stop an operation of power supply in the embodiment.

By referring to FIG. 7, the following description explains an operation by the reference-signal output means 311 to generate a reference signal when both the sine-phase square sum and the cosine-phase square sum do not exceed the threshold value C (that is, the determination result of Step S101 is YES). The pre-drive circuit 531 has switches SW1 and SW2 (cut-off means) such as relays controlled by the microcomputer 31. The output side of the switch SW1 is connected to the transistor T101 and the resistor R117 whereas its input side is connected to the power-supply circuit 35 in the transfer-ratio control unit 3. On the other hand, the output side of the switch SW2 is connected to the resistor R120 whereas its input side is connected to the sinusoidal-wave generation circuit 532 in the electrical-angle detection circuit 53.

In the configuration described above, when a failure occurs due to a power-supply or ground short circuit on the exciting-signal output terminal 535 or the exciting-signal line 536, causing both the sine-phase square sum and the cosine-phase square sum to no longer exceed the threshold value C, the microcomputer 31 issues a command to turn off the power supply to the switch SW1 and outputs a command to stop the operation to supply a signal with a sinusoidal waveform to the switch SW2. In this way, an operation of power supply to a pre-drive circuit (that is, the amplifier circuit) is terminated and no amplification is hence carried out. As a result, the operation to output the exciting signal from the exciting-signal output terminal 535 is also ended.

A method can also be adopted as a method employing only the switch SW1 in the configuration shown in FIG. 7. In this case, an input electric potential appearing at a −terminal of the IC5 is equal to an input electric potential (Vref) appearing at a +terminal thereof, so that no amplification is carried out and an operation to output an exciting signal from the exciting-signal output terminal 535 is stopped too.

(Typical Application to Electric Power Steering Apparatus)

Figure 9:
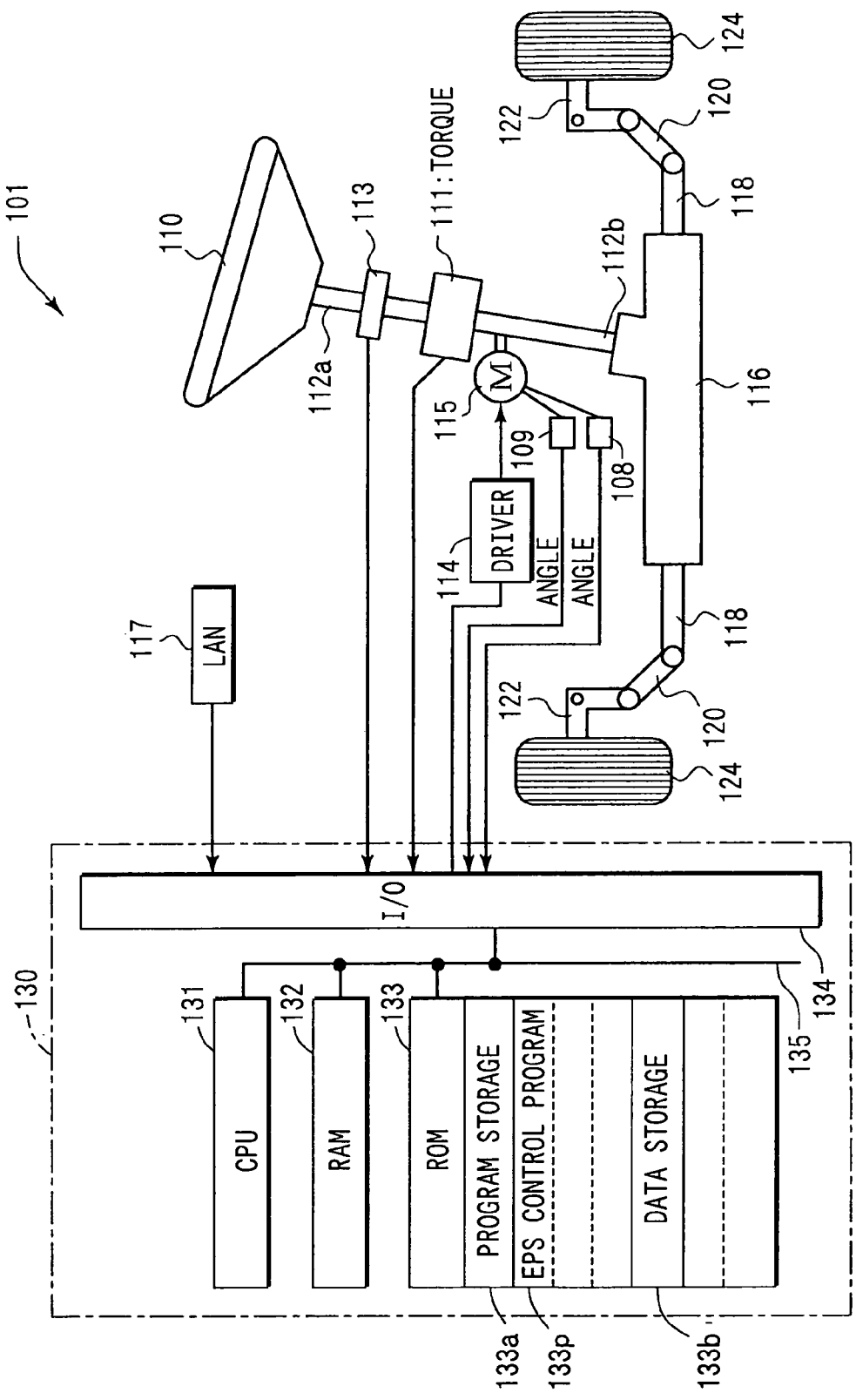
FIG. 9 is a diagram showing the entire configuration of an electric power steering control apparatus.

The rotation detection apparatus according to the present invention is also suitable for an EPS (electric power steering) apparatus 101 of a vehicle. FIG. 9 is a diagram showing a rough configuration of the electric power steering apparatus 101. A steering wheel 110 of the driver is connected to the upper end of a steering shaft 112a as shown in FIG. 1. The lower end of the steering shaft 112a is connected to the upper end of a pinion shaft 112b through a torque sensor 111 for detecting the movement of the steering wheel 110. On the lower end of the pinion shaft 112b, a pinion not shown in the figure is provided. In a steering gear box 116, this pinion is engaged with a rack bar 118. Each of the two ends of the rack bar 118 is connected to a vehicle wheel 124 through a tie rod 120 and a knuckle arm 122. That is, one end of the tie rod 120 is connected to an end of the rack bar 118 and the other end of the tie rod 120 is connected to the knuckle arm 122. An electric motor 115 is installed on the pinion shaft 112b through a gear (not shown). It is to be noted that the electric power steering apparatus 101 can have a configuration in which the electric motor 115 is installed coaxially on the rack bar 118.

A steering control unit 130 comprises a CPU 131, a ROM 133, a RAM 132 and an I/O 134 serving as an input/output interface. The CPU 131, the ROM 133, the RAM 132 and the I/O 134 are connected to each other by typically a bus line 135. The CPU 131 executes control in accordance with programs and data, which are stored in the ROM 133 and the RAM 132. The ROM 133 includes a program storage area 133a and a data storage area 133b. The program storage area 133a is used for storing an EPS control program 133p. On the other hand, the data storage area 133b is used for storing data required in execution of the EPS control program 133p.

The CPU 131 in the steering control unit 130 executes the EPS control program 133p stored in the ROM 133 to compute a driving torque, which is to be generated by the electric motor 115 for a torque detected by the torque sensor 111 and a steering angle detected by a steering-angle sensor 113. The CPU 131 then outputs a voltage for generating the computed driving torque to the electric motor 115 by way of a motor driver 114.

In addition, the electric power steering apparatus 101 includes a circuit similar to the electrical-angle detection circuit 53 shown in FIG. 5. The circuit outputs an exciting signal to an output-angle sensor 109 for detecting an electrical angle of the electric motor 115. Based on the exciting signal, the output-angle sensor 109 outputs rotation-angle information (sine-phase signal and cosine-phase signal) to the circuit. The circuit carries out processing using the rotation-angle information, and controls the electric motor 115 based on a result of the processing.

In this electric power steering apparatus 101, when a failure occurs due to a power-supply or ground short circuit of an exciting-signal output terminal for outputting the exciting signal to the output-angle sensor 109, the electric motor 115 rotates in a manner entirely irrelevant to an operation by the driver on the steering wheel 110 in accordance with the intention of the driver. This may lead to an accident in some cases. In this embodiment, an operation abnormality of the resolver is detected early and predetermined processing to handle the abnormality is carried out to lower the probability of the occurrence of an accident.

(Typical Application to Link System Comprising Transfer-Ratio-Varying Apparatus and an Electric Power Steering Apparatus)

Finally, by referring to FIG. 10, the following description explains a typical application to a steering control system 100 integrating the transfer-ratio-varying steering apparatus 1 and the electric power steering apparatus 101. The transfer-ratio control unit 3 and the EPS control unit 130 in the steering control system 100 have the same configurations and operations as those described earlier. In addition, in the steering control system 100 shown in FIG. 10, all sensors, actuators and peripheral circuits are omitted from the figure except those relevant to the following description.

The transfer-ratio control unit 3 includes a circuit similar to the electrical-angle detection circuit 53 described above by referring to FIG. 5. The circuit outputs an exciting signal to an output-angle sensor 14 for detecting an electrical angle of the electric motor 4. Based on the exciting signal, the output-angle sensor 14 outputs rotation-angle information (sine-phase signal and cosine-phase signal) to the circuit by way of an exciting-signal output terminal 535 and an exciting-signal line 536. The circuit carries out processing using the rotation-angle information, and controls the electric motor 4 based on a result of the processing.

On the other hand, the steering control unit 130 does not have a circuit for outputting an exciting signal. Thus, the exciting signal generated by the transfer-ratio control unit 3 is supplied to the output-angle sensor 109 by way of an exciting-signal output terminal 355a and an exciting-signal line 356a. Based on the exciting signal, the output-angle sensor 109 outputs rotation-angle information (sine-phase signal and cosine-phase signal) to the transfer-ratio control unit 3. The transfer-ratio control unit 3 carries out processing using the rotation-angle information, and controls the electric motor 115 based on a result of the processing.

In the steering control system implemented by this embodiment, a circuit corresponding to the electrical-angle detection circuit 53 can be shared by the transfer-ratio-varying steering apparatus 1 and the steering control unit 130 as a common circuit. Thus, the number of components and the manufacturing cost can be reduced. In addition, in the event of a failure caused by a power-supply or ground short circuit of the exciting-signal output terminal or the exciting-signal line, an operation of power supply to the exciting-signal generation means is stopped to prevent the operation of the steering control system from becoming abnormal.

The embodiments described above are no more than typical implementations of the present invention. That is, the scope of the present invention is not limited to these embodiments. Those skilled in the art will be capable of making changes to the embodiments as long as the changes do not deviate from essentials of ranges defined in claims.

What is claimed is:

1. An apparatus comprising:
a rotation-angle detection means for detecting a rotation angle of a rotating body based on an output signal generated by a resolver;
an exciting-signal generation means for supplying an exciting signal for exciting the resolver to generate the output signal;
an abnormality detection means for detecting an abnormality of an exciting-signal output terminal for outputting the exciting signal or an abnormality of an exciting-signal line for transmitting the exciting signal; and
a power-supply stop means for stopping an operation of power supply to the exciting-signal generation means when the abnormality detection means detects an abnormality of the exciting-signal output terminal or detects an abnormality of the exciting-signal line,
wherein the abnormality detection means detects a failure caused by a short circuit between a power-supply line and the exciting-signal output terminal or the exciting-signal line or a failure caused by a short circuit between a ground line and the exciting-signal output terminal or the exciting-signal line as an abnormality.

2. An apparatus according to claim 1, wherein the abnormality detection means detects a state, in which a sum of squares for a sine-phase signal generated by the resolver in dependence on the exciting signal and a sum of squares for a cosine-phase signal generated by the resolver in dependence on the exciting signal become smaller than a predetermined value, as the two short-circuit failures.

3. An apparatus according to claim 1, wherein the exciting-signal generation means has a reference-signal generation means for generating a reference signal used for generating the exciting signal and the power-supply stop means is used as a means for stopping generation of the reference signal.

4. An apparatus comprising:
a rotation-angle detection means for detecting a rotation angle of a rotating body based on an output signal generated by a resolver;
an exciting-signal generation means for supplying an exciting signal for exciting the resolver to generate the output signal;
an abnormality detection means for detecting an abnormality of an exciting-signal output terminal for outputting the exciting signal or an abnormality of an exciting-signal line for transmitting the exciting signal; and
a power-supply stop means for stopping an operation of power supply to the exciting-signal generation means when the abnormality detection means detects an abnormality of the exciting-signal output terminal or detects an abnormality of the exciting-signal line,
wherein the exciting-signal generation means has a reference-signal generation means for generating a reference signal used for generating the exciting signal and the power-supply stop means has a cut-off means for cutting off a supply of the reference signal.

5. An apparatus according to claim 4, wherein the cut-off means is provided between the reference-signal generation means and the exciting-signal generation means.

6. An apparatus comprising:
a rotation-angle detection means for detecting a rotation angle of a rotating body based on an output signal generated by a resolver;
an exciting-signal generation means for supplying an exciting signal for exciting the resolver to generate the output signal;
an abnormality detection means for detecting an abnormality of an exciting-signal output terminal for outputting the exciting signal or an abnormality of an exciting-signal line for transmitting the exciting signal;
a power-supply stop means for stopping an operation of power supply to the exciting-signal generation means when the abnormality detection means detects an abnormality of the exciting-signal output terminal or detects an abnormality of the exciting-signal line; and
a transfer-ratio-varying steering apparatus, which includes an input shaft connected to a steering wheel, an output shaft connected to vehicle wheels, a transfer-ratio-varying mechanism unit for varying a rotation angle of the output shaft for a given rotation angle of the input shaft, and a link mechanism for making the input and output shafts rotatable as a single body, wherein the link mechanism links the input and output shafts to each other when the power-supply stop means stops a power supply to the exciting-signal generation means.

7. An apparatus according to claim 6 further comprising:

an input rotation-angle detection means for detecting a rotation angle of the input shaft;

an output rotation-angle detection means for detecting a rotation angle of the output shaft;

a relative-angle computation means for computing an angle of the output shaft as an angle relative to the input shaft based on rotation angles of the input and output shafts; and a rotation-angle storage means for storing the relative angle, wherein the rotation-angle storage means stores the relative angle, when the power-supply stop means stops the power supply to the exciting-signal generation means.

8. An apparatus according to claim 6, further comprising:

an electric power steering control apparatus provided for a vehicle for generating a steering assist torque to be given to a steering mechanism by supplying a current to an electric motor based on a steering operation by a driver.

9. An apparatus comprising:

a rotation-angle detection means for detecting a rotation angle of a rotating body based on an output signal generated by a resolver;

an exciting-signal generation means for supplying an exciting signal for exciting the resolver to generate the output signal;

an abnormality detection means for detecting an abnormality of an exciting-signal output terminal for outputting the exciting signal or an abnormality of an exciting-signal line for transmitting the exciting signal;

a power-supply stop means for stopping an operation of power supply to the exciting-signal generation means when the abnormality detection means detects an abnormality of the exciting-signal output terminal or detects an abnormality of the exciting-signal line; and a vehicle steering control apparatus, which includes a transfer-ratio-varying steering apparatus integrated with an electric power steering control apparatus provided in a vehicle, wherein the transfer-ratio-varying steering apparatus includes an input shaft connected to a steering wheel, an output shaft connected to vehicle wheels, a transfer-ratio-varying mechanism unit for varying the rotation angle of the output shaft for a given rotation angle of the input shaft, and a link mechanism for making the input and output shafts rotatable as a single body, wherein the electric power steering control apparatus generates a steering assist torque to be given to a steering mechanism by supplying a current to an electric motor based on a steering operation by a driver, and wherein the transfer-ratio-varying steering apparatus and the electric power steering control apparatus share the exciting-current generation means.

\* \* \* \* \*

UNITED STATES PATENT AND TRADEMARK OFFICE
CERTIFICATE OF CORRECTION

PATENT NO. : 7,268,988 B2 Page 1 of 1
APPLICATION NO. : 11/000907
DATED : September 11, 2007
INVENTOR(S) : Toshio Tsutsui and Masahiro Miyata It is certified that error appears in the above-identified patent and that said Letters Patent is hereby corrected as shown below:

<u>Title page</u>

Correct Item (75), as Inventors: Toshio TSUTSUI, Takahama-city (JP)
              Masahiro MIYATA, Kariya-city (JP)

Signed and Sealed this

Tenth Day of March, 2009

JOHN DOLL
*Acting Director of the United States Patent and Trademark Office*